(12) United States Patent
Hamada et al.

(10) Patent No.: US 9,776,268 B2
(45) Date of Patent: Oct. 3, 2017

(54) PROCESSING TANK RAISING/LOWERING DEVICE AND PROCESSING TANK RAISING/LOWERING METHOD FOR ELECTRICAL DISCHARGE MACHINE

(75) Inventors: Kyoichi Hamada, Aiko-gun (JP); Takayuki Shiomizu, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 266 days.

(21) Appl. No.: 14/426,691

(22) PCT Filed: Sep. 7, 2012

(86) PCT No.: PCT/JP2012/072964
§ 371 (c)(1),
(2), (4) Date: Mar. 6, 2015

(87) PCT Pub. No.: WO2014/038075
PCT Pub. Date: Mar. 13, 2014

(65) Prior Publication Data
US 2015/0231720 A1  Aug. 20, 2015

(51) Int. Cl.
*B23H 7/36* (2006.01)
*B23H 11/00* (2006.01)

(52) U.S. Cl.
CPC .............. *B23H 7/36* (2013.01); *B23H 11/00* (2013.01)

(58) Field of Classification Search
CPC ... B23H 1/10; B23H 7/36; B23H 7/26; B23H 7/101; B23H 11/00; B23H 9/14; B23H 7/30
See application file for complete search history.

(56) References Cited

U.S. PATENT DOCUMENTS

| 7,202,439 B2 | 4/2007 | Ishiwata et al. | |
| 2004/0011768 A1* | 1/2004 | Beaumont | B23H 1/02 219/69.17 |
| 2004/0262266 A1* | 12/2004 | Ishiwata | B23H 1/10 219/69.2 |

FOREIGN PATENT DOCUMENTS

| JP | 9-174340 | 7/1997 |
| JP | 4087259 | 5/2008 |
| JP | 2010-99813 | 5/2010 |

(Continued)

OTHER PUBLICATIONS

International Search Report dated Dec. 11, 2012, directed to International Application No. PCT/JP2012/072964; 2 pages.

*Primary Examiner* — Brian Jennison
(74) *Attorney, Agent, or Firm* — Morrison & Foerster LLP

(57) ABSTRACT

In an electrical discharge machine, the top end of a vertically extending electrode is supported by an electrode holder so as to be able to be raised and lowered, the circumferential surface of the bottom end of said electrode is supported by an electrode guide that is disposed so as to be able to move vertically with respect to the electrode holder, and the position of said electrode guide is detected by a position detection unit. This electrical discharge machine is provided with a work-tank raising/lowering device. During electrical discharge machining, said work-tank raising/lowering device raises/lowers a work tank, in accordance with the electrode-guide position (Hg) detected by the position detection unit, so as to set the distance from a prescribed part of the work tank to the electrode-guide position (Hg) equal to a prescribed value (Ha).

2 Claims, 6 Drawing Sheets

(56) References Cited

FOREIGN PATENT DOCUMENTS

| JP | 2010-105074 | 5/2010 |
|----|-------------|--------|
| JP | 4490655 | 6/2010 |

* cited by examiner

PROCESSING TANK RAISING/LOWERING DEVICE AND PROCESSING TANK RAISING/LOWERING METHOD FOR ELECTRICAL DISCHARGE MACHINE

CROSS REFERENCE TO RELATED APPLICATIONS

This application is a U.S. National Phase patent application of PCT/JP2012/072964, filed on Sep. 7, 2012, which is hereby incorporated by reference in the present disclosure in its entirety.

FIELD OF THE INVENTION

The present invention relates to a processing tank raising/lowering device for an electrical discharge machine and a processing tank raising/lowering method for raising and lowering a processing tank of an electrical discharge machine having an electrode guide.

BACKGROUND OF THE INVENTION

Conventionally, there has been known an electrical discharge machine in which an electrode holder and an electrode guide are provided so as to be moveable relative to each other in the vertical direction, and the electrode of a bar-like shape is supported at its upper end by the electrode holder so as to be movable up and down while the electrode is supported on the peripheral side at its lower end by the electrode guide (see Patent Literature 1, for example). In the electrical discharge machine according to Patent Literature 1, a partitioning plate for adjusting the surface level of the machining fluid is provided so as to be slidable up and down along a cutout window of the processing tank while the up-and-down movement of the partitioning plate is mechanically linked with the up-and-down motion of the W-axis slide that supports the electrode guide, whereby the liquid surface level is changed in linkage with the raising/lowering of the electrode guide.

However, in the electrical discharge machine according to above Patent Literature 1, since the partitioning plate moves up and down in linkage with the up-and-down motion of the W-axis slide, the operativity is deteriorated when, for example, preparatory work for the electrical discharge machine is performed with the electrode guide remaining at a raised position.

Patent Literature 1: Japanese Patent No. 4490655

SUMMARY OF THE INVENTION

A processing tank raising/lowering device according to one aspect of the present invention includes: an electrode holder for supporting a vertically extended electrode at the upper end thereof so as to be movable up and down; an electrode guide arranged vertically movable relative to the electrode holder to support the lower end of the electrode on the outer peripheral side thereof; a position detector for detecting the position of the electrode guide; a processing tank for holding machining fluid in which a workpiece is immersed at the time of electrical discharge machining; a processing tank lift for raising and lowering the processing tank; and, a lift controller having an elevation coordinating function for controlling the processing tank lift in accordance with the electrode guide position so that the machining fluid surface is positioned at a height over the electrode guide position by a predetermined distance, and is characterized in that the lift controller validates the elevation coordinating function at the time of electrical discharge machining and invalidates the elevation coordinating function at time of non-machining.

One aspect of the present invention is a processing tank raising/lowering method of raising and lowering a processing tank for holding machining fluid in which a workpiece is immersed at the time of electrical discharge machining, comprising the steps of: supporting a vertically extended electrode at the upper end thereof by an electrode holder so as to be movable up and down, and supporting the lower end of the electrode on the outer peripheral side thereof by an electrode guide arranged vertically movable relative to the electrode holder; detecting the position of the electrode guide by a position detector; and, raising or lowering the processing tank in accordance with the position of the electrode guide so that the level of the machining fluid surface is positioned a predetermined distance from the electrode guide position at the time of electrical discharge machining, and invalidating the function of raising and lowering the processing tank in accordance with the electrode guide position at the time of non-machining.

DETAILED DESCRIPTION OF THE INVENTION

Figure 1:
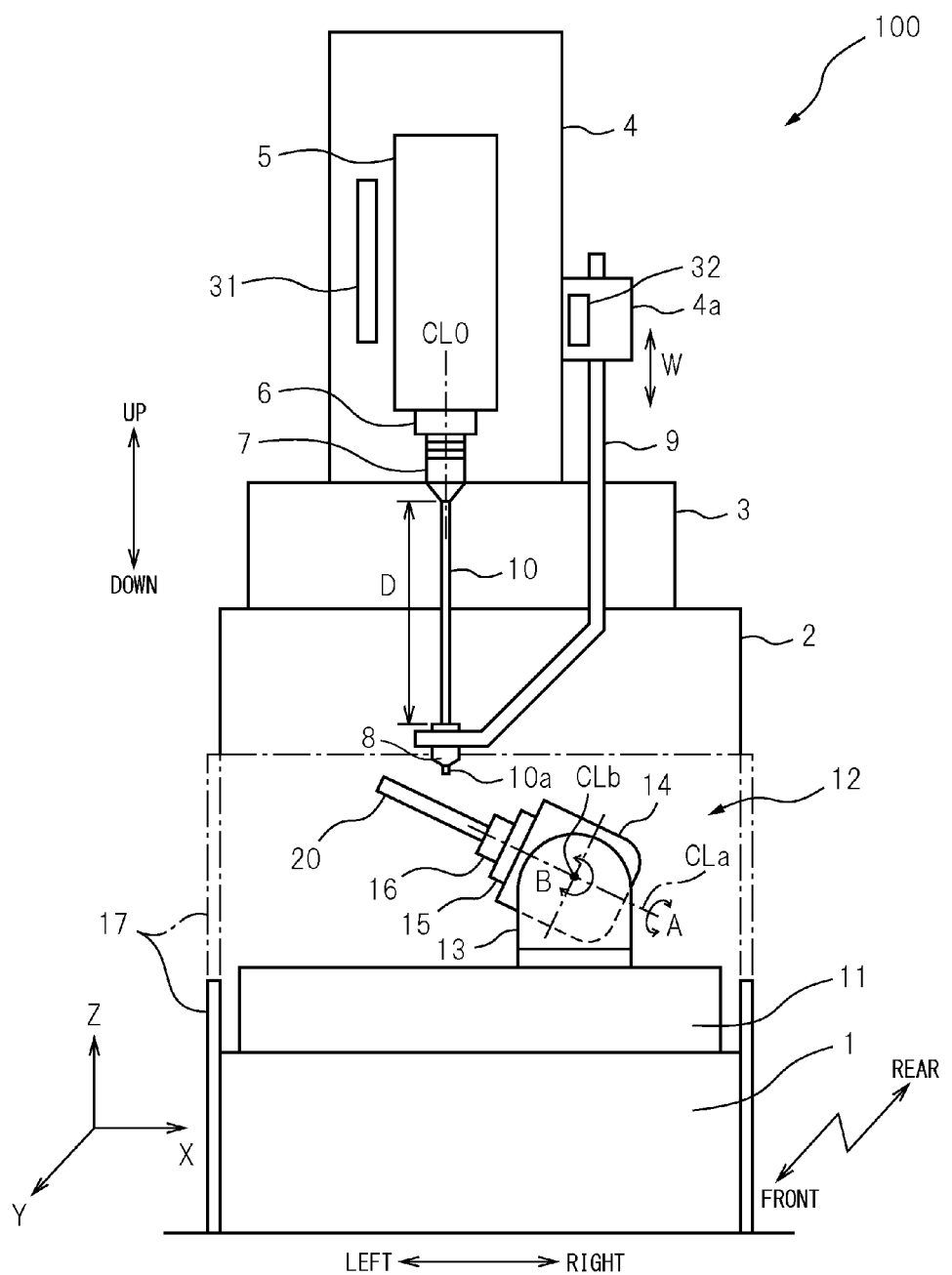
FIG. 1 A front view schematically illustrating essential components of an electrical discharge machine to which a processing tank raising/lowering method according to an embodiment of the present invention is applied.

Referring to FIGS. 1 to 7, one embodiment of a processing tank raising/lowering device according to the present invention will be described. In the configuration of an electrical discharge machine to which the present invention is applied will be described. FIG. 1 is a front view schematically illustrating essential components of an electrical discharge machine 100 according to the embodiment of the present invention. In the description hereinbelow, for convenience the three orthogonal directions (X-axis direction, Y-axis direction, Z-axis direction) are defined as the left-to-right direction, front-to-rear direction and vertical direction as illustrated, and based on this definition, the configuration of each component will be described.

In FIG. 1, a column 2 is fixed upright in the rear part of a bed 1 as a pedestal. An X-slider 3 is supported on the top face of the column 2 so as to be movable in the X-direction (left-to-right direction). A ram 4 is supported on the top face of the X-slider 3 so as to be movable in the Y-direction (front-to-rear direction). A main spindle head 5 is supported on the front face of the ram 4 so as to be movable in the Z-direction (vertical direction). Projected from the bottom face of the main spindle head 5 is the front end of a rotational main spindle 6. An electrode holder 7 is attached to the lower end of the rotational main spindle 6. An electrode guide 8 is disposed vertically below the electrode holder 7, and is supported by the lower end of a grip arm 9. The grip arm 9 is supported by a bracket 4a provided on the right side face of ram 4 so as to be movable in the vertical direction. This vertical moving axis of the grip arm 9 is defined to be the W-axis.

Between the electrode holder 7 and electrode guide 8, an electrode 10 is extended along a vertical axis CL0 that passes through the centers of electrode holder 7 and electrode guide 8. The electrode 10 is a cylindrical pipe electrode and is held at its upper end by the electrode holder 7. The lower end of electrode 10 vertically penetrates through the electrode guide 8. The electrode 10 is supported on outer peripheral side by the electrode guide 8 so as to be able to slide in the vertical direction inside the electrode guide 8 while its movement (deviation) in the front-to-rear and right-to-left directions is constrained. A machining fluid such as water, or the like, is supplied into the pipe electrode 10, so that the machining fluid is ejected from the front end (lower end) of the pipe electrode 10. Here, oil may also be used as the machining fluid.

A table 11 is arranged in front of column 2 on the top face of bed 1. Mounted on the top face of table 11 is a tiltable rotary table device 12. The tiltable rotary table device 12 includes a pair of supporters 13 projected upward from the top face of table 11 and arranged in front and rear positions, a tiltable member 14 supported between the front and rear supporters 13 so as to be rotatable in B-axis directions about a pivot CLb extended in the direction of the Y-axis, and a rotary table 15 supported on the left endface of tiltable member 14 so as to be rotatable in A-axis directions about a pivot CLa perpendicular to the pivot CLb. The rotary table 15 is equipped with a chuck 16, which supports a workpiece 20. An elevatable processing tank 17 is provided around the table 11, so as to enclose the whole of table 11 and tiltable rotary table device 12. The chain line in FIG. 1 depicts a machining state where the processing tank 17 has been raised, whereas the processing tank 17 is moved down as depicted by the solid line and set in the non-machining state when performing preparation work such as attachment or removal of workpiece 20.

Though not illustrated, the electrical discharge machine 100 of FIG. 1 includes: an X-axis driver for moving the X-slider 3 in the left-to-right direction; a Y-axis driver for moving the ram 4 in the front-to-rear direction; a Z-axis driver for moving the main spindle head 5 in the vertical direction; a main spindle driver for rotating the rotational main spindle 6 about the axis CL0; an arm driver for moving the grip arm 9 in the vertical direction; a B-axis driver for tilting the pivotable member 14 via the pivot CLb; and an A-axis driver for rotating the rotary table 15 via the pivot CLa. The X-axis driver, Y-axis driver, Z-axis driver and arm driver may be configured of a ball screw and a servomotor for rotationally driving the ball screw, for example. The main spindle driver may be configured of a spindle motor, for example. The B-axis driver and A-axis driver may be configured of a DD (direct drive) servomotor, for example.

With the above configuration, the electrode holder 7 and electrode guide 8 can be relatively move in the X-axis direction, Y-axis direction and Z-axis direction with respect to the workpiece 20. Accordingly, it is possible to machine the workpiece 20 into a desired 3D shape. Raising and lowering the grip arm 9 by the arm driver enables adjustment of the distance between the electrode holder 7 and the electrode guide 8, and therefore it is possible with the electrode holder 7 and the electrode guide 8 to support the top and bottom ends of electrode 10 during machining even though the length of electrode 10 changes due to consumption of the electrode 10.

Provided on the front face of ram 4 is a position detector 31 such as a linear scale or the like for detecting the Z-axis position along the vertical direction of the main spindle head 5. Based on the signal from the position detector 31, it is possible to detect the position of electrode holder 7, or the position of the upper end of electrode 10. The bracket 4a of grip arm 9 is equipped with a position detector 32 for detecting the W-axis position along the vertical direction of grip arm 9 relative to the ram 4. Based on the signal from the position detector 32, it is possible to detect the position of electrode guide 8 relative to ram 4.

There is a fixed relationship (known value) unique to the machine between the Z-axis position and the W-axis position. The position detectors 31 and 32 detect the position of electrode holder 7 and the electrode guide 8, respectively, as a distance from the reference position in the machine coordinate system. Accordingly, based on the signals from position detectors 31 and 32, the distance D between the lower end of electrode holder 7 and the upper end of electrode guide 8 can be calculated. When the distance D is equal to or shorter than a predetermined value D1, approaching motion of the electrode holder 7 to the electrode guide 8 is stopped by force. As a result, contact between the electrode holder 7 and the electrode guide 8 is prevented. Although not illustrated, an electrode magazine is provided at the side of the arm 9. A plurality of electrodes 10 for replacement having a known initial length are stored in the electrode magazine, so that electrodes 10 can be exchanged between the main spindle 6 and the tool magazine by an unillustrated replacing means.

Figure 2:
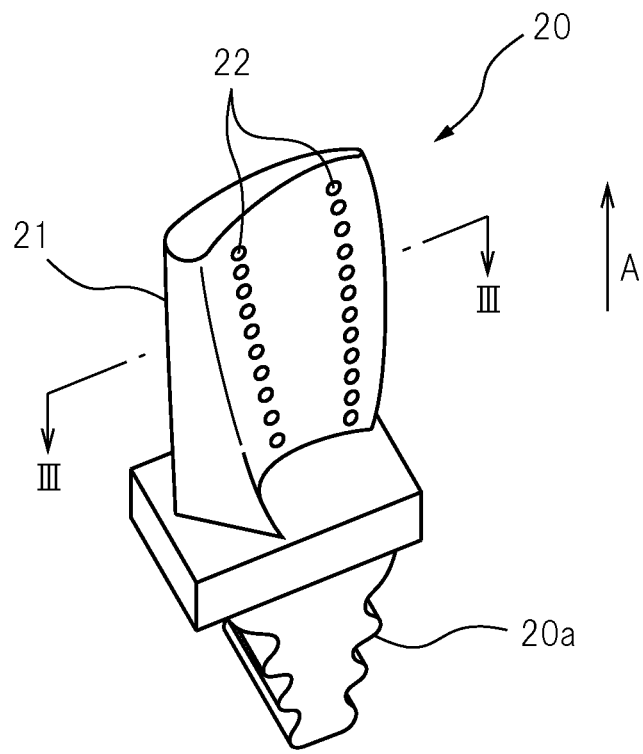
FIG. 2 A perspective view of a turbine blade as an example of a workpiece to which the present invention is applied.
Figure 3:
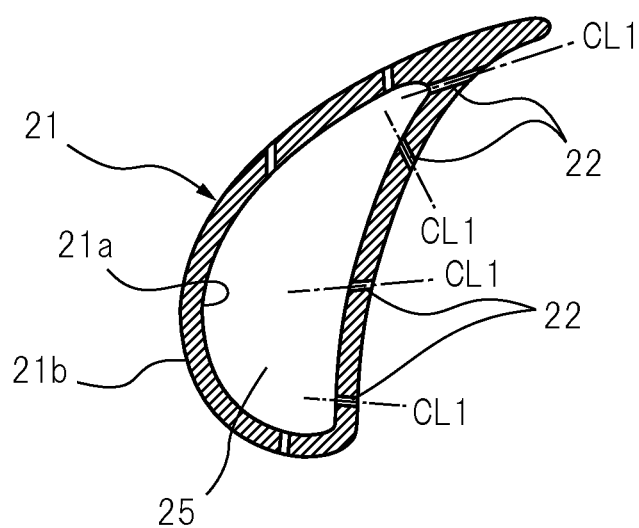
FIG. 3 A sectional view cut along a line III-III in FIG. 2.

Examples of workpiece 20 include turbine blades and vanes used for gas turbines, jet engines and others. FIG. 2 is a perspective view of a turbine blade as one example of workpiece 20. FIG. 3 is a sectional view cut along a line III-III in FIG. 2. For example, a Christmas tree-shaped supporter 20a is formed at one end of a turbine blade 20. In the assembled state of an engine, the supporter 20a is attached to the peripheral side of a rotatable rotor. The turbine blade 20 is formed by a lost-wax casting process, for example.

As shown in FIGS. 2 and 3, a cavity 25 is formed inside an airfoil 21 of the turbine blade 20. The airfoil 21 has an interior surface 21a facing the cavity 25 and an exterior surface 21b exposed to high-temperature gas. The airfoil 21 has cooling holes 22 formed penetrating therethrough at multiple positions in the peripheral direction of airfoil 21 and aligned in large numbers in the height direction (in the direction of arrow A in FIG. 2) of airfoil 21. Cooling air is supplied to the cavity 25 from the rotor side and discharged from individual cooling holes 22. With this arrangement, a film of cooling air flows along the external surface 21b to cool the airfoil 21.

Figure 4:
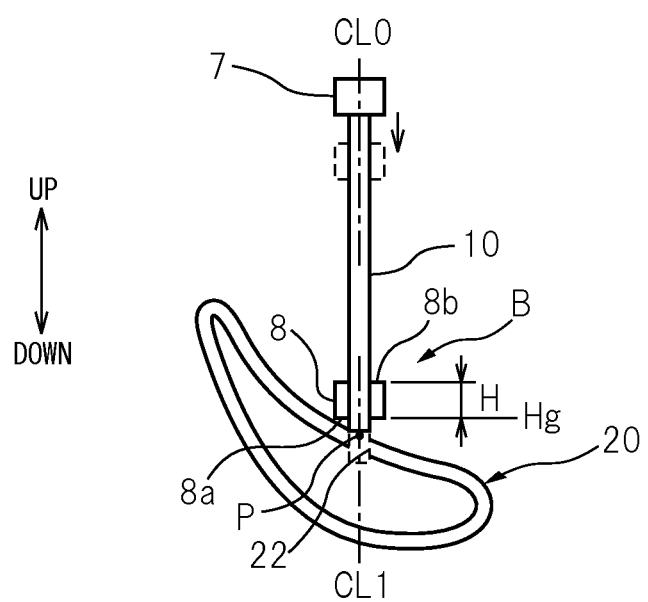
FIG. 4 A diagram illustrating a machining operation on a workpiece by the electrical discharge machine of FIG. 1.

FIG. 4 is a diagram schematically illustrating a machining operation of cooling holes 22. As shown in FIG. 4, in machining a cooling hole 22, the workpiece 20 is held by the tiltable rotary table device 12 in such a machining attitude that the central axis CL1 of the cooling hole 22 is oriented in the vertical direction. Further, a move of the electrode guide 8 along the W-axis is instructed by the machining program so as to move the electrode guide 8 to the electrode support position B above the machining start point P on the workpiece 20. From this condition, the electrode holder 7 is moved down so that the electrode 10 moves down, whereby the workpiece 20 is machined with the tip of the electrode 10 by electrical discharging (the broken line in FIG. 4).

During machining, the grip arm 9 is fixed relative to ram 4 in order to position the electrode guide 8 at the electrode supporting position B regardless of downward movement of the electrode holder 7. By this arrangement, the upper and lower ends of electrode 10 are supported above the workpiece 20, whereby it is possible to suppress oscillation of the electrode 10 during machining. In FIG. 4, H represents the height from the lower endface 8a to the upper endface 8b of the electrode guide 8 (the full height of electrode guide 8). In the embodiment, the height position of the electrode guide 8 in the Z-axis direction of the mechanical coordinate system, i.e., the electrode guide position Hg, is represented by the position of the bottom endface 8a of electrode guide 8.

In the electrical discharge machine 100 of the present embodiment, the electrode guide 8 has been set beforehand at an optimal height, i.e., a height position close to the workpiece surface but out of contact therewith in accordance with the machining attitude of the workpiece 20 by the machining program, and the position of the W-axis is changed in accordance with the machining attitude. Therefore, if the height of the machining fluid is fixed regardless of the machining attitude of the workpiece 20, there is a risk that the rotational main spindle 6 is immersed in the machining fluid when the electrode guide position Hg has been set at a low point and the electrode holder 7 moves close to the electrode guide 8 in the course of hole machining. When the rotational main spindle 6 is immersed in the machining fluid, the machining fluid penetrates into the interior of rotational main spindle 6, inducing failures. Even though the rotational main spindle 6 is not immersed into the machining fluid, immersion of the electrode holder 7 in the machining fluid scatters the working liquid over the area around because of jagged external configurations of the electrode holder 7, degrading the working environment. On the other hand if the electrode guide position Hg is set at a height point, an aerial discharge that occurs when the machined part is not immersed, takes places, making machining unstable.

For this reason, it is preferable that the height of the machining fluid surface is changed depending on the electrode guide position Hg so that the rotational main spindle 6 and the electrode holder 7 will not be immersed in the machining fluid or an aerial discharge will not take place either. For this purpose, it may be possible for example, for the electrode guide 8 to be mechanically connected to the processing tank 17 so as to make the electrode guide position Hg in linkage with the height of the processing tank 17. However, this raises the processing tank 17 without fail to a higher position when the electrode guide 8 is moved upward. As a result, the processing tank 17 stands in the way in preparatory work for attachment and removal of the workpiece 20, in replacement work of electrodes 10 and the like, possibly degrading operativity. Taking account of this aspect, the processing tank raising/lowering device in the present embodiment is configured as follows.

Figure 5:
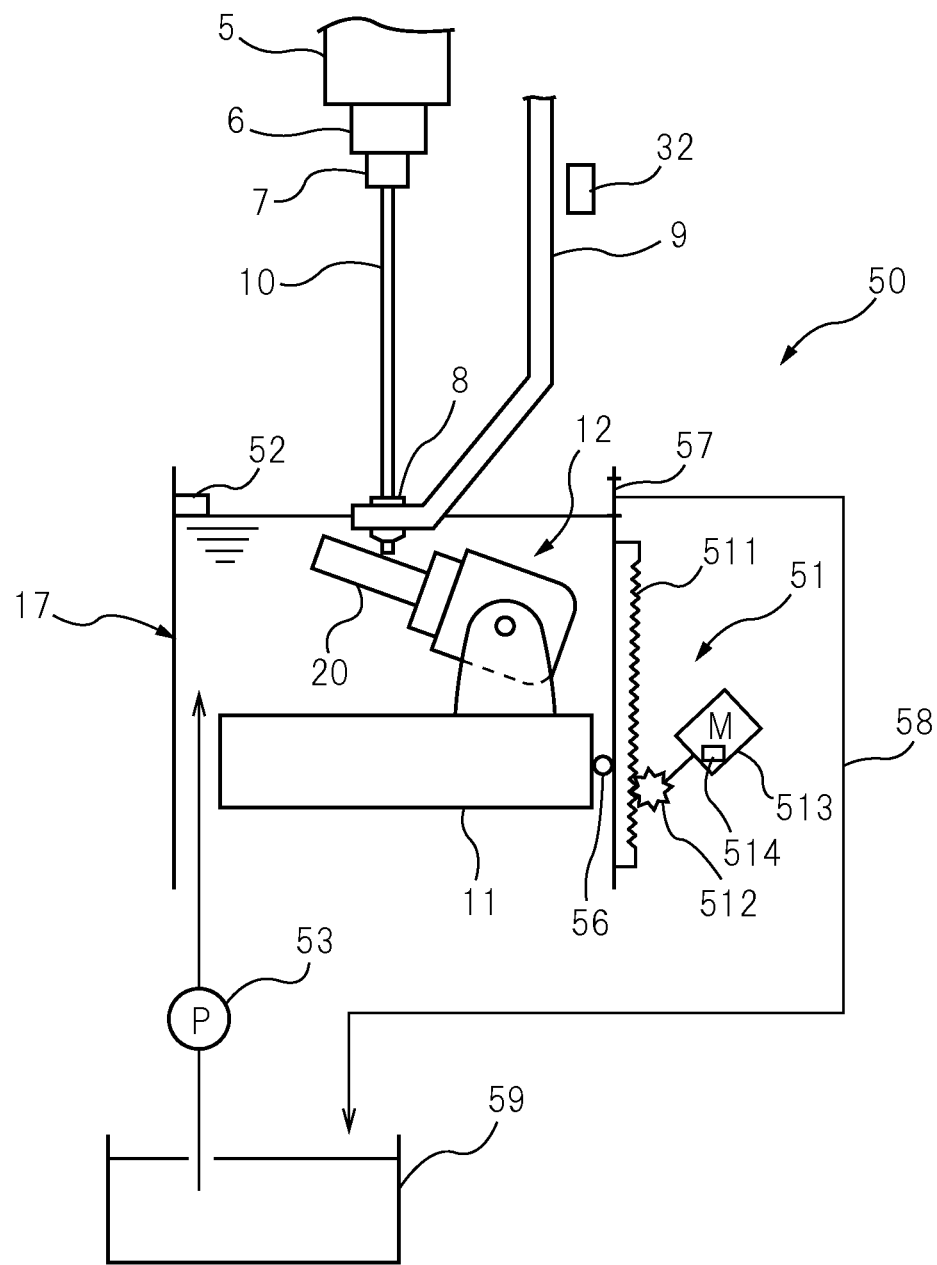
FIG. 5 A diagram illustrating essential components of a processing tank raising/lowering device according to an embodiment of the present invention.
Figure 6:
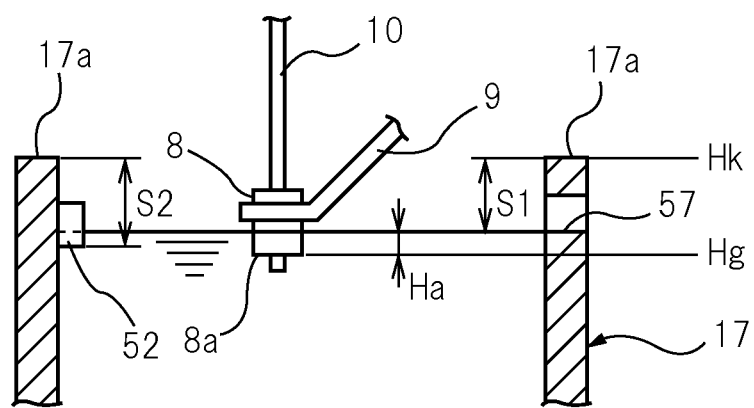
FIG. 6 is a diagram specifying several settings around the upper end of the processing tank of FIG. 5.

FIG. 5 is a diagram schematically illustrating a configuration of essential components of FIG. 1, depicting main constituents of a processing tank raising/lowering device 50 according to the present embodiment. FIG. 6 is a diagram specifying several settings in the proximity of the upper end of the processing tank 17. As shown in FIG. 5, the processing tank raising/lowering device 50, in addition to the aforementioned electrode holder 7, electrode guide 8, position detector 32 and processing tank 17, includes a lift 51 for moving up and down the square-shaped processing tank 17, a fluid level detector 52 for detecting the level of liquid, and a machining fluid pump 53 for supplying a machining fluid into the processing tank 17. Interposed between the inner peripheral side of processing tank 17 and the outer peripheral side of table 11 is a seal 56, which seals the inner peripheral side of processing tank 17.

The lifting mechanism 51 includes a rack 511 formed on the outer peripheral side of the processing tank 17 and a pinion 512 engaging the rack 511 and a servomotor 513 for driving the pinion 512, and moves up and down the processing tank 17 by rotation of the servomotor 513. The servomotor 513 incorporates an encoder for a position detector 514, hence can detect the height of the processing tank 17 from a reference position, based on the signal from the encoder. Hereinafter, the height of processing tank 17 (processing tank height Hk) is represented by the position of the upper endface 17a of processing tank 17 as depicted in FIG. 6. The position detector 514 may also be configured of other than the encoder.

As illustrated in FIGS. 5 and 6, the processing tank 17 has a drain port 57 that is opened at a position a predetermined distance S1 below from the upper endface 17a of processing tank 17. The machining fluid flowing out from the drain port 57 is collected in a tank 59 via a return pipe path 58. Accordingly, the height of the surface of the machining fluid in the processing tank 17 is limited, hence will not become higher than the drain port 57. When the processing tank 17 is moved up and down, the level of the machining fluid surface also moves up and down.

The fluid level detector 52 is attached on the inner peripheral side of the processing tank 17. The fluid level detector 52 is a float switch that turns on when the machining fluid reaches the fluid level detector 52 and turns off when the liquid surface is located below the fluid level detector 52. The position of operation of the fluid level detector 52 is set somewhat lower than the drain port 57, or a predetermined distance S2 (>S1) below from the upper endface 17a of processing tank 17. Turning on and off of the fluid level detector 52 enables detection of whether the height of liquid surface rises up to the proximity of the drain port 57.

The machining fluid pump 53 is a volume-variable pump that can provide two, high and low, selectable pumping volumes, so that the discharge quantity of the machining fluid into processing tank 17 can be varied by selection of pumping volume. Alternatively, the pump 53 may be configured to be able to select rotational speed between high and low modes, so that the discharge quantity of the machining fluid can be changed by selection of rotational speed while the pumping volume is fixed. The servomotor 513 and the machining fluid pump 53 are controlled by a control unit 60 (FIG. 7).

Figure 7:
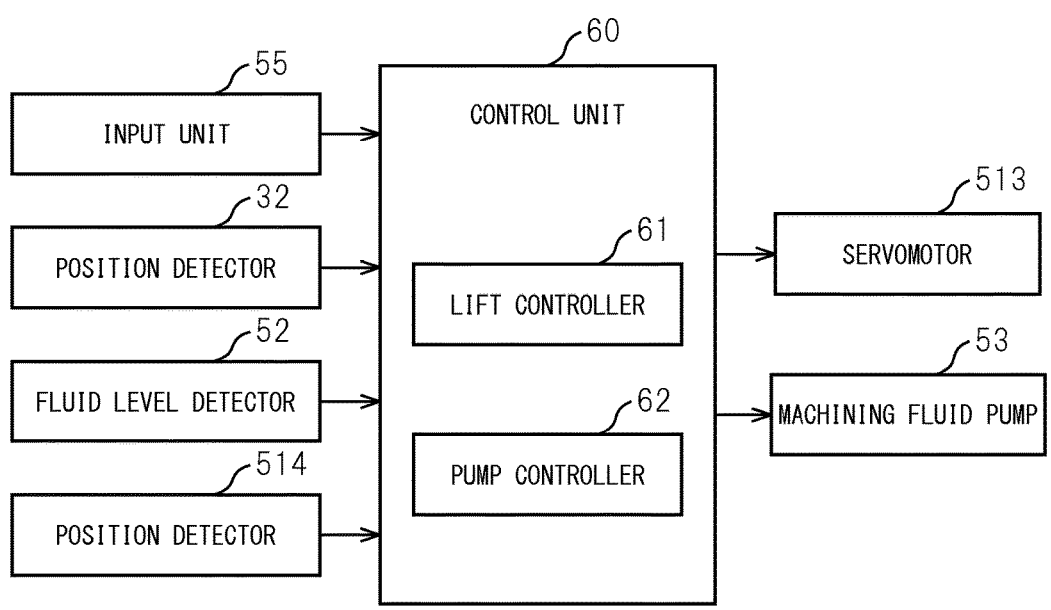
FIG. 7 A block diagram illustrating essential components of a processing tank raising/lowering device according to an embodiment of the present invention.

FIG. 7 is a block diagram illustrating a control configuration of the processing tank raising/lowering device 50 according to the present embodiment. The control unit 60 is a computer including a processing unit formed of CPU, ROM, RAM, other peripheral circuitry, etc. This control unit 60 is built in an NC unit (Numerical Control Unit) that controls diverse components of the electrical discharge machine 100 based on the predetermined machining program. The machining program is written in the form of M codes with various pieces information such as an electrical discharge machining start command for instructing the start of electrical discharge machining, an electrical discharge machining end command for instructing the end of electrical discharge machining and the electrode guide position Hg (the electrode supporting position B in FIG. 4) corresponding to a machining point P.

The control unit 60 is set in advance with a target height Ha of the machining fluid surface. As shown in FIG. 6, the target height Ha is set as the distance from the electrode guide position Hg to the machining fluid surface. The relationship between the electrode guide position Hg and the processing tank height Hk is given as illustrated. The electrode guide position Hg plus the known distance S1 from the upper endface 17a of processing tank 17 to the drain port 57 and the target height Ha amounts to the processing tank height Hk. The target height Ha may be set to be not more than the full height H (FIG. 4) of electrode guide 8, for example, set to be equal to H or about one half of H.

As depicted in FIG. 7, the control unit 60 receives input of signals from an input unit 55 through which various instructions relating to processing tank raising/lowering control are given, the position detector 32, the fluid level detector 52 and the position detector 514. The control unit 60, based on these input signals, executes predetermined processing and outputs control signals to the servomotor 513 in the lift 51 and the machining fluid pump 53. The control unit 60 includes a lift controller 61 and a pump controller 62 as functional components.

The lift controller 61 has a function (elevation coordinating function) for controlling the servomotor 513 in accordance with the signal from the position detector 514 so that the distance from the electrode guide position Hg that has been detected by the position detector 32 to the machining fluid surface (drain port 57) will become equal to the target height Ha. When reading an electrical discharge machining start command from the machining program, the lift controller 61 validates the elevation coordinating function to control the servomotor 513 so that the distance from the electrode guide position Hg to the machining fluid surface will be equal to the target height Ha. The target height Ha is equal to or shorter than the full height H of electrode guide 8. With this setting, the machining fluid level will not become higher than the electrode guide 8 at the time of electrical discharge machining, so that it is possible to prevent the rotational main spindle 6 and electrode holder 7 from being immersed in the machining fluid.

Thereafter, when reading an electrical discharge machining end command, the lift controller 61 invalidates the elevation coordinating function. In this case, the controller outputs a control signal to servomotor 513 so as to control the processing tank height Hk to a predetermined position regardless of the electrode guide position Hg. For example, the machining fluid in the processing tank 17 is drained while the processing tank 17 is lowered to the lowermost position to set the processing tank height Hk to the lowest position. Thereby, the workpiece 20 is exposed outside of the processing tank 17. Accordingly, the processing tank 17 will not stand in the way, and therefore it is possible to easily perform preparatory work such as attachment and removal of workpiece 20 as well as replacement of electrodes 10.

The elevation coordinating function may also be invalidated not only when an electrical discharge machining end command is issued but also when an electrical discharge machining stop command is output by a switch operation. It is also possible to provide such a configuration that the processing tank height Hk is held at the height as it is when the elevation coordinating function is made invalid. It is also possible to provide such a configuration that the processing tank height Hk after the end of electrical discharge machining can be adjusted by a switching operation or the like in a state where the elevation coordinating function has been invalidated.

The input unit 55 includes a pump starting switch. The pump starting switch is turned off when preparatory work or replacement work for electrodes 10 is performed. When the pump starting switch is turned off, the pump controller 62 outputs a drive stop signal to the pump 53 to stop pump 53 driving. When the processing tank 17 is raised after preparatory work or replacement work of electrodes 10 and the pump starting switch is turned on, the pump controller 62 outputs a drive signal to the pump 53 to start the pump 53.

When the pump start switch is in on-state, the pump controller 62 switches the pumping volume in accordance with the signal from the fluid level director 52. Specifically, when the fluid level detector 52 is off, the pumping volume is set to be high; when the fluid level detector 52 is turned on, the pumping volume is set to be low. With this arrangement, when, for example, electrical discharge machining is started after preparatory work, the pump 53 ejects a high volume of machining fluid until the fluid level detector 52 is turned on (rapid injection mode). As a result, it is possible to supply the necessary amount of machining fluid into the processing tank 17 quickly, whereby the working efficiency is improved. After fluid level detector 52 is turned on, the amount of ejection from the pump 53 is cut down so that the machining fluid can be constantly circulated in the processing tank 17 during electrical discharge machining (circulation mode). This makes it possible to remove foreign substances (dust) in the machining fluid from the processing tank 17.

According to the present embodiment, it is possible to obtain effects as follows:

(1) The lift controller 61 is configured to have an elevation coordinating function for controlling the processing tank 17 so as to rise and lower in accordance with the electrode guide position Hg so that the height from the electrode guide position Hg detected by the position detector 32 to the level of the machining fluid surface will correspond to the target height Ha, validate this elevation coordinating function at the time of electrical discharge machining, and invalidate the elevation coordinating function at the time of non-machining such as at the end of machining, during discharging the machining fluid from the processing tank 17, during preparatory work of workpiece 20 and during replacement of electrodes 10. As a result, in preparatory work and the like, the electrode guide position Hg will not link with the processing tank height Hk, so that preparatory work and replacement work of electrodes can be readily done.

(2) Since the lift controller 61 controls the servomotor 513 so that the processing tank 17 is set at the lowermost position at the time of non-machining, the workpiece 20 is exposed outside the processing tank 17, hence the processing tank 17 will not stand in the way in preparatory work, replacement work of electrodes and the like, improving work efficiency.

(3) The lift controller 61 validates the elevation coordinating function in response to a command of the machining program for starting electrical discharge machining and invalidates the elevation coordinating function in response to a command for ending electrical discharge machining. Accordingly, it is possible to make the elevation coordinating function valid and invalid at appropriate timing.

(4) The fluid level detector 52 is arranged on the inner peripheral side of processing tank 17. When a command for starting electrical discharge machining is given by the machining program, the pump controller 62 performs such control as to set the pumping volume high until the fluid level detector 52 detects a rise of the machining fluid surface to the predetermined level slightly below from the drain port 57, and performs such control as to set the pumping volume low when the rise of the machining fluid to the predetermined level has been detected. With this arrangement, a large amount of machining fluid is supplied into the processing tank 17 right after the electrical discharge machining start command is given, whereas a small amount of machining fluid is supplied when the surface of the working liquid comes close to the drain port 57. As a result, it is not only possible to quickly create an electrical discharge machinable state from a state where no machining fluid is stored in the processing tank 17, but also possible to circulate the machining fluid without supplying machining fluid more than needed, after the necessary amount of fluid is pooled in the processing tank 17.

(5) When the processing tank 17 is under the raising and lowering control, The target height Ha, from the electrode guide position Hg to the machining fluid surface, is set to be equal to or lower than the distance H (the full-height of the electrode guide), from the lower endface 8a to the upper endface 8b of the electrode guide 8, it is possible to prevent both the rotational main spindle 6 and the electrode holder 7 from being immersed in the machining fluid at the time of electrical discharge machining whereby an aerial discharge is prevented.

Variational Example

In the above embodiment, the lift controller 61 having an elevation coordinating function controls the lift 51 so that the distance from the drain port 57 to the electrode guide position Hg becomes equal to the target height Ha. However, as long as the distance from a predetermined position to the electrode guide position Hg is defined as a target height, the place to be defined as the target height is not limited to that described above. For example, the distance from the upper endface 17a of processing tank 17 to the electrode guide position Hg may be set as a target height. Though the target height Ha is set to be equal to or lower than the full-height H of electrode guide 8, from the viewpoint of preventing failures of the rotational main spindle 6 the target height Ha may be set, at least, equal to or lower than the height of rotational main spindle 6. Accordingly, by detecting the height of the rotational main spindle 6 based on the signal from the position detector 31, for example, the target height Ha may be set in accordance with the detected height of the rotational main spindle 6.

The lift controller 61 validates the elevation coordinating function by regarding an input of an electrical discharge start command as the period of electrical discharge machining and invalidates the elevation coordinating function by regarding an input of an electrical discharge end signal as the period other than electrical discharge machining. However, validation and invalidation of the elevation coordinating function may be performed based on other instructions that present correlation between the start and end of electrical discharge machining. Though the start and end commands of electrical discharge machining are issued by M codes of the machining program, these commands may be output by other than M codes. Though the control unit 60 is configured of an NC unit, the control unit may be configured of, for example a CAM unit (Computer Aided Manufacturing Unit), and the machining program generated by the CAM unit may be adapted to involve the target height Ha.

Although, in the above embodiment, the position detector 32 detects the position Hg of electrode guide 8, the position detector may have any configuration. The processing tank 17 for holding machining fluid in which the workpiece 20 is immersed during electrical discharge machining, may be given in any configuration. Though the lift 51 is configured of a rack-and-pinion mechanism, but the configuration of processing tank lift is not limited to this. The electrical discharge machine 100 may have any configuration as long as it includes a bar-like, vertically extended electrode 10, an electrode holder 7 supporting the upper end of electrode 10, and an electrode guide 8 that is arranged under the electrode holder 7 so as to be vertically movable relative to the electrode holder 7 and that supports the peripheral side of the electrode 10 at the lower end so that the electrode 10 can move up and down. Although the pipe electrode 10 is used, the solid electrode can also be used.

The fluid level detector 52 may have any configuration as long as the fluid level detector can detect rise of the machining fluid surface up to the predetermined position a predetermined distance below from the upper end of processing tank 17. Although the machining fluid is supplied into the processing tank 17 by the machining fluid pump 53, the machining fluid supplier may have any configuration other than the pump. Accordingly, the supply controller may be formed by other than the pump controller 62 so as to supply machining fluid at a predetermined flow rate (first flow rate) until the machining fluid surface rises to the predetermined position and supply machining fluid at a second flow rate lower than the first flow rate after when the machining fluid surface has reached the predetermined position.

The processing tank raising/lowering method for raising and lowering the processing tank 17 for holding the machining fluid in which a workpiece 20 is immersed at the time of electrical discharge machining may have any configuration as long as the method includes the steps of: supporting a vertically extended electrode 10 at the upper end thereof by an electrode holder 7 so as to be movable up and down, and supporting the lower end of the electrode 10 on the outer peripheral side thereof by an electrode guide 8 arranged vertically movable relative to the electrode holder 7; detecting the position of the electrode guide 8 by a position detector 32; lifting up or down the processing tank 17 in accordance with the electrode guide position Hg so that the distance from a predetermined part (drain port 57) of the processing tank 17 to the electrode guide position Hg detected by the position detector 32 becomes equal to a predetermined value Ha at the time of electrical discharge machining, and invalidating the function of raising and lowering the processing tank in accordance with the electrode guide position Hg at the time of non-machining.

Though, in the above embodiment, a turbine blade is used as an example of workpiece 20, the electrical discharge machining method of the present invention can be applied to a case where another workpiece is machined. Accordingly, it is possible to apply the electrical discharge machining method of the present invention to a case where the machining attitude of workpiece 20 varies, other than the case where cooling holes are machined.

According to the present invention, at the time of electrical discharge machining, the processing tank is moved up or down in accordance with the electrode guide position so that the distance from a predetermined position of the processing tank to the electrode guide position becomes a predetermined value, whereas this elevation coordinating function is invalidated at the time of non-machining. Accordingly, the electrode guide position and the processing tank height will not operate in linkage with each other in preparatory work, etc., it is hence possible to easily perform preparatory work and replacement of electrodes.

DESCRIPTION OF REFERENCE NUMERALS 7 electrode holder
8 electrode guide
8a lower endface
8b upper endface
10 electrode
17 processing tank
20 workpiece (turbine blade)
32 position detector
50 processing tank raising/lowering device
51 lifting mechanism
52 fluid level detector
53 machining fluid pump
60 control unit
61 lift controller
62 pump controller
100 electrical discharge machine
Hg electrode guide position
Ha target height

The invention claimed is:

1. An electrical discharge machine for forming holes in a workpiece by moving a bar-like vertically extended electrode attached to a vertically movable spindle toward the workpiece in an axial direction of the electrode, comprising:
   an electrode holder for supporting the electrode at an upper end thereof and attaching the electrode to the spindle;
   an electrode guide arranged vertically movable relative to the electrode holder to support a lower end of the electrode on an outer peripheral side thereof;
   a position detector for detecting the position of the electrode guide;
   a processing tank for holding machining fluid in which a workpiece is immersed at a time of electrical discharge machining;
   a drain port opened at a position with a predetermined distance below from an upper endface of the processing tank so as to limit a level of a surface of the machining fluid in the processing tank;
   a processing tank lift for raising and lowering the processing tank; and
   a tank height position detector adapted to detect a height position of the processing tank;
   a lift controller having an elevation coordinating function for controlling the processing tank lift in accordance with an electrode guide position so that the machining fluid surface is positioned at a height above a lower endface of the electrode guide by a distance equal to or less than the total height of the electrode guide, based on the electrode guide position, output from the position detector, and the height position of the processing tank, output from the tank height position detector, wherein the lift controller allows the elevation coordinating function when a command of starting electrical discharge machining is given and prohibits the elevation coordinating function when a command of ending electrical discharge machining is given.

2. The electrical discharge machine according to claim 1, further comprising:
   a fluid level detector for detecting whether the surface of machining fluid has risen to a predetermined position a predetermined distance below from the upper end of the processing tank;
   a machining fluid supplier for supplying machining fluid into the processing tank; and
   a supply controller that, when a command of starting electrical discharge machining is issued by the machining program, controls the machining fluid supplier to supply machining fluid at a first flow rate until a rise of the machining fluid surface to the position over the electrode guide position by a predetermined distance is detected by the fluid level detector and supply machining fluid at a second flow rate that is lower than the first flow rate when the fact that the machining fluid surface has risen to the predetermined position from the electrode guide position, is detected by the fluid level detector.

* * * * *